United States Patent [19]

Ghahary

[11] Patent Number: 5,504,126
[45] Date of Patent: Apr. 2, 1996

[54] MINERAL-LIKE COATING AND METHODS OF USING SAME

[75] Inventor: Akbar Ghahary, Ringwood, N.J.

[73] Assignee: Safas Corporation, Clifton, N.J.

[21] Appl. No.: 206,810

[22] Filed: Mar. 4, 1994

Related U.S. Application Data

[63] Continuation-in-part of Ser. No. 882,839, May 14, 1992, Pat. No. 5,304,592, Ser. No. 35,720, Mar. 23, 1993, Pat. No. 5,465,544, and Ser. No. 51,627, Apr. 22, 1993, said Ser. No. 882,839, and Ser. No. 51,627, each is a continuation-in-part of Ser. No.788,982, Nov. 7, 1991, abandoned.

[51] Int. Cl.⁶ ............................. C09D 5/29; C08G 63/48; C08L 67/00
[52] U.S. Cl. ............................ 523/171; 525/43; 525/169; 525/170; 525/171
[58] Field of Search ....................... 524/436, 437, 524/448, 445, 492, 494, 405, 425, 560, 13, 266, 267; 525/43, 64, 169, 170, 171; 523/201, 171; 428/407

[56] References Cited

U.S. PATENT DOCUMENTS

| | | | |
|---|---|---|---|
| 4,085,246 | 4/1978 | Buser et al. | 428/220 |
| 5,043,377 | 8/1991 | Nogi et al. | 524/437 |
| 5,244,941 | 9/1993 | Bruckbauer et al. | 523/171 |
| 5,286,290 | 2/1994 | Risley | 106/401 |

FOREIGN PATENT DOCUMENTS

| | | | |
|---|---|---|---|
| 2197457 | 9/1987 | Japan | 524/437 |
| 8901504 | 2/1989 | WIPO . | |

*Primary Examiner*—Paul R. Michl
*Assistant Examiner*—LaVonda R. Dewitt
*Attorney, Agent, or Firm*—Lieberman & Nowak

[57] ABSTRACT

The subject invention provides an improved simulated mineral article which comprises a discrete suspended plastic material and a continuous thermoplastic matrix. The plastic material and the thermoplastic matrix are visually distinguishable and each contains a coupling agent. The subject invention also provides a method of preparing a simulated mineral article which entails preparing a liquid thermoplastic to serve as a matrix and then suspending a plastic material therein. The plastic material is composed of a thermoset plastic made from resin which comprises an acid component having thermoplastic characteristics. The invention also concerns a method of coating a thermoplastic article with a thermoset surface coat which has increased binding affinity toward the article.

1 Claim, No Drawings

MINERAL-LIKE COATING AND METHODS OF USING SAME

This application is a continuation-in-part of U.S. patent application Ser. No. 07/882,839, filed May 14, 1992, now U.S. Pat. No. 5,304,592 U.S. patent application Ser. No. 08/035,720, filed Mar. 23, 1993, now U.S. Pat. No. 5,465,544, and U.S. patent application Ser. No. 08/051,627, filed Apr. 22, 1993. U.S. patent application Ser. No. 07/882,839 now U.S. Pat. No. 5,304,592 and U.S. patent application Ser. No. 08/051,627 are in turn continuations-in-part applications of U.S. patent application Ser. No. 07/788,982, filed Nov. 7, 1991, now abandoned. The contents of the above-referenced applications are hereby incorporated by reference into the present disclosure.

BACKGROUND OF THE INVENTION

The subject invention relates generally to resins and methods of manufacture which facilitate the bonding between the thermoplastic and thermoset fractions in a plastic article. In one aspect of the invention, a synthetic material is provided which simulates natural substances such as stone, granite and like minerals. This material is similar to the material disclosed in the inventor's copending U.S. application Ser. No. 08/051,627, filed Apr. 22, 1993, except that the material of the present application has superior properties such as impact strength and ultraviolet radiation resistance.

In another aspect of the invention, a method is provided for coating a thermoplastic article with thermoset plastic material, specifically a thermoset plastic which provides a synthetic surface that simulates various natural substances such as stone, granite and the like.

There currently exists a great need for synthetic materials which mimic the appearance of natural stone, and in particular granite. Such materials are commonly used in the manufacture of flooring, tiles, counter tops, sinks, architectural accoutrements, ornamental objects, and for other purposes for which natural materials are used. The present invention provides compositions and methods for the production of improve plastic article which have the appearance of natural stone.

SUMMARY OF THE INVENTION

The subject invention provides an improved simulated mineral article which comprises a discrete suspended plastic material and a continuous thermoplastic matrix. The plastic material and the thermoplastic matrix are visually distinguishable.

The subject invention also provides a method of preparing a simulated mineral article which entails preparing a liquid thermoplastic to serve as a matrix and then suspending a plastic material therein. The plastic material is composed of a thermoset plastic made from resin which comprises an acid component having thermoplastic characteristics.

The invention also concerns a method of coating a thermoplastic article with a thermoset surface coat which has increased binding affinity toward the article.

DETAILED DESCRIPTION OF THE DRAWINGS

This section details various preferred embodiments of the subject invention. These embodiments are set forth to illustrate the subject invention, but are not to be construed as limiting.

As used throughout the application, the term thermoplastics has the generally accepted meaning in the art and includes, but is not limited to, ABS (polymers produced by polymerizing acrylonitrile, butadiene and styrene), ACS (polymers of polymerized acrylonitrile, chlorinated polyethylene and styrene), olefin-modified styrene-acrylonitrile, acetal homopolymer, acetal copolymer, ionomers, nitrile resins, phenylene-based resins, polyamine-imide, modified polyphenylene ether, polybutylene, polycarbonate, aromatic polyester, thermoplastic polyester (e.g., polybutylene terephthalate, polytetramethylene terephthalate or polyethylene terephtlalate), polypropylene, polyetheretherketone, polyetherimide, ethylene acid copolymer, ethylene-ethyl acrylate, ethylene-methyl acrylate, ethylene-vinyl acetate, polyimide, polymethylpentene, polyphenylene sulfide, nylon, acrylic, polyethylene, etc. and combinations thereof.

Thermoset plastics are plastics requiring a chemical additive to cause a state conversion of the plastic from liquid to solid. Such thermoset plastics include, but are not limited to, allyl esters, aminoresins, furan polymers, phenolic resins, unsaturated alkyd polyester, unsaturated polyester, epoxies and melamine.

Generally, thermoplastics possess thermo-reversible intermolecular bonds which allows them to be reform or fluidized with the application of heat. Thermoset plastics possess chemical intermolecular bonding and cannot be reformed, recycled or fluidized by applying heat.

Since this patent application is not a primer on forming and handling of plastics, basic concepts known to those skilled in the art have not been set forth in detail. Concepts such as choosing a proper solvent or amount are readily determinable by those skilled in the art. Attention is directed to Modern Plastics Encyclopedia which is published annually by McGraw-Hill Inc. in which temperatures, choice of solvents, curing agents, etc. are set forth in detail. The text of Modern Plastics Encyclopedia, all volumes, is herein incorporated by reference. Reference is also made to "Textbook of Polymer Science" by Billmeyer, 3rd Ed., 1984, the contents of which are hereby incorporated by reference into the present disclosure.

Generally, the subject compositions of the present application are an improvement over those disclosed in the inventor's co-pending application, U.S. Ser. No. 07/882,839, the contents of which are incorporated by reference. Reference should be made to the inventor's earlier application for a more detailed description of some of the ingredients used in the compositions of the present application. The teachings of the present disclosure may also be used in connection with compositions other than those disclosed in the inventor's earlier application, such as suitable plastics, fiberglass, glass reinforced resins, and the like. Any such use is contemplated to be within the spirit and scope of the present invention.

The inventor's co-pending application, U.S. Ser. No. 07/882,839, discloses simulated mineral article comprising a plastic material composed of a thermoset plastic and a thermoplastic suspended in a thermoplastic matrix. The simulated mineral article may be an end-use article such as a countertop or sink, or it may be pellet or granule which is used in the production of an end-use article. Although an advancement over the prior art, the simulated articles of the inventor's earlier application had several disadvantages. The binding between the suspended plastic material, which has thermoset properties, and the thermoplastic matrix was not strong. This characteristic sometimes results in low impact strength for the end-use article. Additionally, the plastic material, which gives the end-use article its mineral-like appearance, had a lower resistance to ultraviolet radiation than the surrounding thermoplastic matrix, thereby resulting in a faster fading of the plastic material areas than the rest of the article.

The compositions of the present invention overcome the disadvantages of the simulated mineral articles of U.S. Ser.

No. 07/882,839 by modifying the characteristics of the suspended plastic material and utilizing coupling agents to promote binding between the thermoset plastic fractions and the thermoplastic fractions.

As taught in U.S. Ser. No. 07/882,839, the plastic material is formed from a thermoset resin. Typically, this resin is made from an alcohol component (preferably, a combination of propylene glycol and neopentyl glycol) and an acid component (preferably, maleic acid or anhydride). The present invention provides an improved resin for the manufacture of the thermoset plastic material in which a portion of the acid component is substituted with acid having thermoplastic characteristics, such as acroleic acid or acrylic acid. The substitution of a thermoplastic-type acid in the manufacture of the thermoset resin produces a thermoset plastic material having increased ultraviolet resistance and stronger binding capabilities to thermoplastic matrixes. End-use articles possessing suspended plastic material in accordance with the present invention exhibit higher impact strength and more uniform fading characteristic with respect to ultraviolet radiation.

Besides the resin, the plastic material may also comprise one or more pigments and/or one or more fillers, see U.S. Ser. No. 07/882,839 for a more detailed description. The plastic material, usually in the form of flakes or granules, is then mixed with the thermoplastic matrix to produce an end-use article having a simulated mineral look, or pellets which may extruded or molded to produce an end-use article having a simulated mineral look. It is another aspect of this invention to modify the compositions of the plastic material and the thermoplastic matrix by adding a coupling agent to each. Preferably, the coupling agent added to plastic material is different than but complementary to the coupling agent added to the thermoplastic matrix. The addition of coupling agents to the plastic material and the matrix further promotes binding between the thermoset fractions and thermoplastic fractions of the finished article, thus providing higher impact strength to the article.

In the preferred embodiments the coupling agent added to the plastic material is a waterborne acrylic polymer, such as the acrylic polymer sold under the tradename Joncryl 2630 by S.C. Johnson Polymer, S.C. Johnson & Son, Inc., Racine, Wis. The coupling agent added to the thermoplastic matrix is a polyfunctional material, preferably a polyacrylic polymer such as the polymer sold under the tradename Lotader.®

The invention will be further illustrated with the description of preferred compositions. One suitable resin for the manufacture of thermoset plastic materials of the present invention consists of:

an alcohol component of 40% by weight of propylene glycol and 60% neopentyl glycol; and an acid component of 30% maleic acid or anhydride, 40% isophthalic acid or anhydride, and 30% acroleic acid.

The resulting polymerized composition is thinned down by the addition of a styrene monomer. After setting to form the resin, the plastic material is produced by mixing:

about 35% by weight of resin, 2% pigment, 61% filler and 2% coupling agent (a waterborne acrylic polymer).

The resulting plastic material is produced as flakes or granules and is added at about 48% by weight to about 50% by weight of thermoplastic matrix (e.g. ABS) and 2% of coupling agent (a polyacrylic polymer).

The resulting composition is typically extruded to produce pellets which may be used to produce plastic article having a simulated mineral look. Although this is a preferred composition, variations due to the inclusion of additional constituents are acceptable.

In another aspect of the invention, the thermoset resin may be used in the production of the compositions disclosed in the inventor's co-pending application U.S. Ser. No. 08/051,627, the contents of which are incorporated by reference into the present disclosure.

The invention of U.S. Ser. No. 08/051,627 provides a composition of matter for forming a coating, such as one which simulates granite. The coating composition comprises a gel coat and granules. The granules, which comprise a thermoplastic and a thermoset plastic, are visually differentiable from the gel coat. A method of coating an article is also provided. The method comprises preparing a coating composition comprising the specified gel coat and granules, and contacting the article with the coating composition. Contacting may be by brushing, rolling, spraying or curtain walling the coating composition onto the article. Alternatively, contacting may comprises coating the interior surface of a mold with the coating composition, then forming the article on the coated mold so that the article is contacted with the coating composition, then removing the coated article from the mold.

By using the compositions, resins and methods of the present invention, the coating composition and coating method of U.S. Ser. No. 08/051,627 are improved. Greater binding affinity between the thermoplastic and thermoset fractions of the granules is experienced resulting in a stronger coating composition. More importantly, the coating composition (which is primarily a thermoset composition) has exhibited greater binding affinity to coated thermoplastic articles.

In a preferred embodiment, the thermoset coating is sprayed onto an interior surface of an injection mold. The coating material is manufactured with the resins of the present invention and may include one of the above described coupling agents. The thermoplastic material to be used in the injection molding may also comprise one of the above described coupling agents. When cured, the molded thermoplastic article is coated, either partially or completely, with a thermoset coating that simulates various natural substances such as granite.

In an alternative procedure, a molded thermoplastic article may be coated by creating a mold of the finished article, coating the interior surface of the mold with a coating composition of the present invention, and contacting the mold and article together so that the article is coated with the coating composition.

The coating procedure of the present invention results in labor and time saving since the thermoset coating in many instances need not be sanded.

Upon reading the subject application, various alternative embodiments will become obvious to those skilled in the art. These alternative embodiments are to be considered within the scope and spirit of the subject invention. The subject invention is only to be limited by the claims which follow and their equivalents.

What is claimed is:

1. A simulated mineral article comprising an ABS resin matrix, containing up to 2% by weight of the matrix of an acrylic polymer as a coupling agent and containing a particulate suspended in said matrix to provide a mineral appearance, said particulate comprising a thermoset resin obtained by reaction of an alcohol component containing neopentyl glycol and propylene glycol and an acid component containing maleic acid or anhydride and acrylic acid and up to 2% by weight of the particulate of a water borne acrylic polymer as a coupling agent the concentration of the particulate being in the range of from about 48 to about 50 percent by weight of the matrix.

\* \* \* \* \*